United States Patent [19]

Grant et al.

[11] Patent Number: 4,773,471

[45] Date of Patent: Sep. 27, 1988

[54] INTEGRATED WATER MISTING HEATING AND COOLING SYSTEM FOR POULTRY BUILDINGS OR THE LIKE

[76] Inventors: Ace A. Grant; Vivian M. Grant, both of 1119 Circulo Del Sur, Green Valley, Ariz. 85614

[21] Appl. No.: 169,279

[22] Filed: Mar. 17, 1988

[51] Int. Cl.$^4$ .......................... F24F 3/14; A01K 1/02
[52] U.S. Cl. .......................................... 165/3; 165/12; 165/19; 165/48; 165/1; 165/60; 119/21; 119/31; 432/222; 261/30; 261/79.2
[58] Field of Search ...................... 165/3, 48.1, 12, 19, 165/60; 119/21, 16, 31, 33, 34, 35; 432/222; 261/30, 79.2

[56] References Cited

U.S. PATENT DOCUMENTS

| | | |
|---|---|---|
| 1,922,086 | 8/1933 | Hart ..................................... 119/31 |
| 1,936,326 | 11/1933 | Carson, Jr. .............................. 119/31 |
| 2,419,119 | 4/1947 | Christensen ............................ 165/3 |
| 3,389,687 | 6/1968 | Trussell ................................ 119/21 |
| 4,213,379 | 7/1980 | Cromby ................................ 119/16 |
| 4,224,900 | 9/1980 | Truhan ................................ 119/21 |
| 4,278,423 | 7/1981 | Siccardi ............................... 432/222 |
| 4,369,030 | 1/1883 | Siccardi ............................... 432/37 |
| 4,373,912 | 2/1983 | Mitchell .............................. 432/222 |
| 4,443,387 | 4/1984 | Gordon ................................ 119/21 |
| 4,524,722 | 6/1985 | Siccardi ............................... 119/34 |
| 4,609,346 | 9/1986 | Siccardi .............................. 432/222 |
| 4,700,887 | 10/1987 | Timmons ............................. 119/31 |

FOREIGN PATENT DOCUMENTS 0040036  4/1981  Japan ...................................... 165/12

Primary Examiner—Albert W. Davis, Jr.
Assistant Examiner—John K. Ford
Attorney, Agent, or Firm—Harry M. Weiss & Assoc.

[57] ABSTRACT

A heating and cooling system for improving the environment in buildings having a large open area, such as poultry buildings, utilizes an electronic ignition to control the temperature and humidity environment. The electronic ignition controls, in a pulsating fashion, the flow of gas feeding a pilot and burner and electrical powwer feeding electro-mechanical relays powering an assortment of blower, circulating fans, as well as a water pump used to distribute water to a water misting cooling arrangement coupled to a main blower and circulating fans to aid in cooling a building. The system includes a set of emergency cooling fans, thermal shutdown switch activates an alarm device to assure a safe and controlled environment in the building.

16 Claims, 3 Drawing Sheets

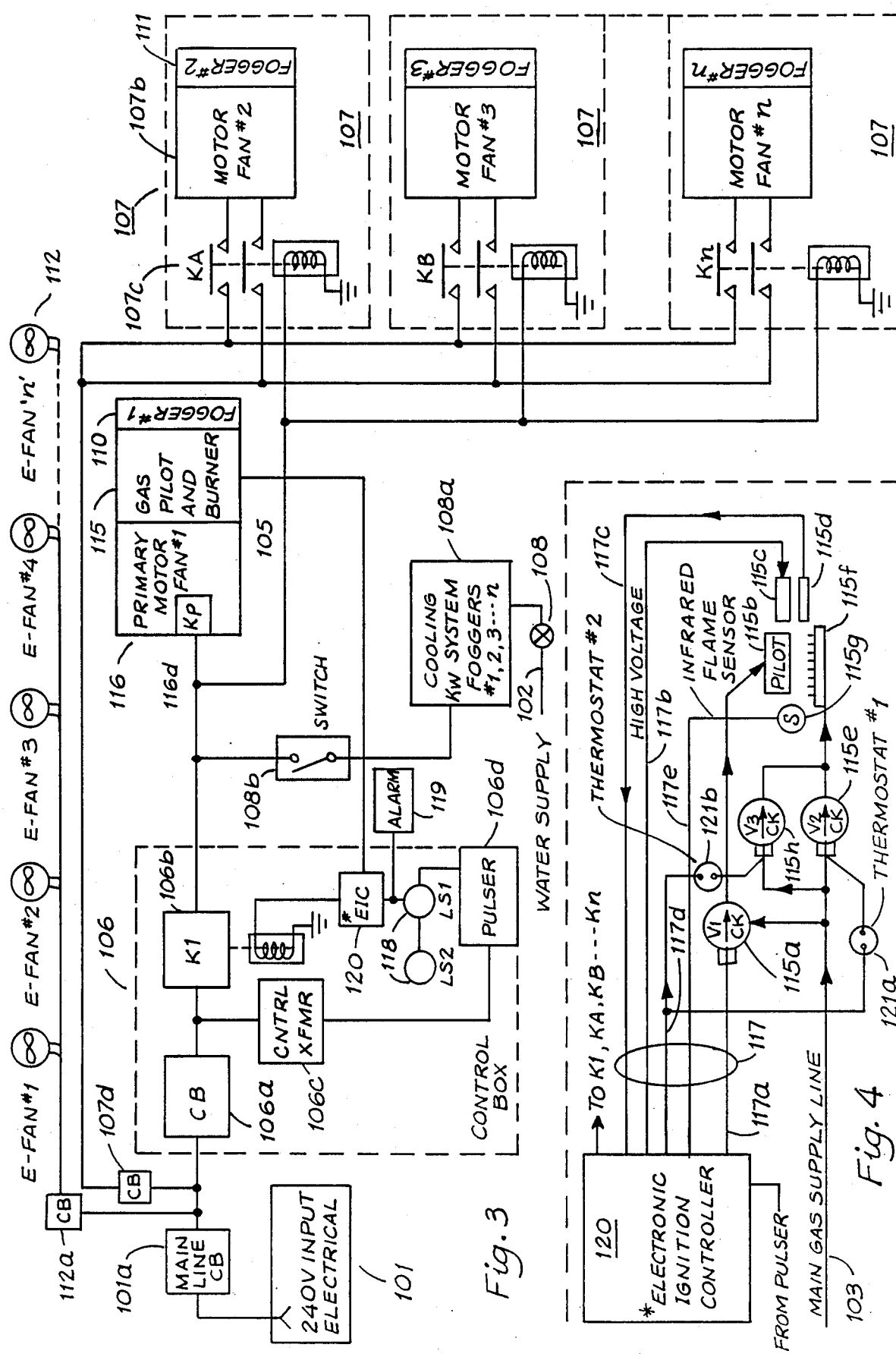

INTEGRATED WATER MISTING HEATING AND COOLING SYSTEM FOR POULTRY BUILDINGS OR THE LIKE

FIELD OF THE INVENTION

The present invention relates to heating and cooling systems for buildings having a large open area and minimal wall construction. More particularly, the present invention relates to a heating and cooling system for buildings, such as poultry buildings, having a large open area wherein the building walls are provided in the form of adjustable curtains to aid in maintaining the environment in the open area at an optimum temperature and humidity level. The heating and cooling system, in combination with provided adjustable curtains, controls the temperature and humidity environment in the building by providing a continuous wave of pulsating, conditioned air in a circulating pattern within the open area of the building. The conditioned air is generated within an enclosed unit having a gas burning heater, a main blower and a controlled water misting arrangement at an air exhaust end of the main blower. The system is enhanced by the provision of booster circulating fans having a simialr water misting arrangement at an air exhaust end and synchronized with the main blower to maintain the continuous wave of conditioned air. The heating and cooling system includes safety features such as emergency fans, for use in the event of system failure, and thermal limit switches electrically coupled to activate an alarm system.

DESCRIPTION OF THE PRIOR ART

It is known to provide a building, having adjustable curtains as walls and a large open area within, with a heater and blower arrangement to control the environment. It is also known to provide thermal limit switches to disable a system in the event of an elevated temperature. Typical of the prior art teachings are U.S. Pat. Nos. 4,278,423, 4,369,030 and 4,524,722. The prior art teaches thermostatically controlled heating and cooling units provided with high air velocity blowers which are activated according to temperature settings of the thermostats located out of the direct path of the air flow pattern in the building. U.S. Pat. No. 4,278,423 teaches a heating and cooling system for poultry houses wherein a heater and cooling unit is provided with a fan and burner which ignites according to an electric signal and responsive to thermostat settings. Also taught in U.S. Pat. No. 4,278,423 is the use of thermal limit switches set to turn the power off in the event of an elevated temperature condition, typically greater than 160 degrees Fahrenheit. U.S. Pat. No. 4,369,030 teaches an improvement to a similar heating and cooling system of U.S. Pat. No. 4,278,423 by adding a curtain controller and an automatic damper on the air inlet portion of the unit. U.S. Pat. No. 4,524,722 teaches a method wherein the livestock body heat is factored in the utilization of a heating and cooling system described in U.S. Pat. Nos. 4,278,423 and 4,369,030 by including circulating fans and variable duty factor operation of the system.

The prior art does not teach an integrated humidity control apparatus with the heater and cooling units, rather, the addition of moisture to the building environment is not considered, since in the known systems, excess moisture is considered the norm. The known systems teach controlling humidity by injecting large quantities of air to push the moist air through the open curtains. In regions where high temperatures and low humidity is a problem, heating and cooling systems in buildings provided with only blowers to bring in the outside air, are not adequate to maintain the environment at a comfortable level. Solutions to the problem in some cases involve manual control of the curtains in combination with utilization of cooling units, such as refrigerated air conditioning units which are expensive to operate and are inconsistent for use with buildings constructed with adjustable curtains for walls.

The prior art does not teach providing a heating and cooling system which synchronizes the pulsating operation of the heater and main blower with the booster circulating fans to better provide a continuous pulsating wave of conditioned air circulating throughout the open area of the building. This deficiency results in large temperature variations at the ground level where livestock well being is affected.

The prior art is also deficient in providing safety control devices other than thermostats, thermal limit switches and electrical circuit breakers which are merely coupled with the power on/off control portion of the system to turn off power. Examples of safety control devices which present heating and cooling systems do not provide include thermal limit switches which also activate an alarm system which is integral with the system control wiring which could not only maintain the total system in a powered-off state during a thermal condition generally at an elevated temperature compared to thermostat settings, but also simultaneously alert the building manager that the livestock is without a heating and cooling system. Related safety control devices felt need but not provided in present heating and cooling system are emergency fans which would be activated upon the failure of the system and responsive to the alarm system. The failures are generally results of loss of a blower due to belt driven blower motors.

Therefore, a need exits to provide a heating and cooling system for buildings, such as poultry buildings, having a large open area, with a means which will aid in cooling the environment and control the humidity by using a water misting arrangement integral with the known heating and cooling elements normally provided on heating and cooling systems.

A need is also seen to exist to improve in the synchronization of the air circulating devices and burner operation to maintain a continuous wave of pulsating conditioned air in the building to achieve a more uniform distribution of temperatures at ground level, whereby liverstock's well being is improved. A need is also seen to exist to provide air circulation devices that are more reliable in operation and which are not belt driven.

A need is also seen to exist in providing safety devices which will not only activate and maintain the system in a powered-off state during an elevated temperature condition, but also alert a building manager of the failed system. The failed system results in a related need to provide a back-up emergency fan system which could aid in preventing loss of livestock in poultry buildings during failure of the main heating and cooling system.

SUMMARY OF THE INVENTION

The present invention provides an improved heating and cooling system designed to satisfy the aforementioned needs. Therefore, a primary objective of the invention is directed at providing a a heating and cooling system for buildings, such as poultry buildings, having a large open area, with a means which will aid in cooling the environment and controlling the humidity by using a water misting arrangement integral with a heating and cooling systems having modified controls and improved operating features according to the aforementioned needs.

Another object of the present invention is to provide an improved control operating panel which will result in better synchronization of the air circulating devices and burner operation for maintaining a continuous wave of pulsating conditioned air in the building.

Yet another object of the present invention is to provide air circulation devices that are more reliable in operation and which are not belt driven.

Still another object of the present invention is to provide safety devices which includes an alarm system which will not only activate and maintain the system in a powered-off state during an elevated temperature condition, but also alert the building manager of the failed system.

A further object of the present invention is to provide a back-up emergency fan system which could aid in preventing losses of livestock in poultry buildings during failure of the main heating and cooling system.

Briefly described, and in accordance with one embodiment thereof, the present invention provides a heating and cooling system for installation within a building, such as a poultry building, said building having adjustable side curtains, an electrical source, a pressurized gas fuel source and a pressurized water source available for utilization by said system, the system being comprised of a main forced-air heating and cooling means having an inlet port and outlet port for forcing conditioned air into a mainstream airflow pattern within the poultry building, a plurality of booster fans means for helping to circulate the air, a control means for electronically controlling the operation of said heating and cooling system and a set of emergency fans for use as a back-up means for maintaining airflow to livestock in the event of loss of the main system.

The heating and cooling means includes a heater member having a plurality of gas valves, including a gas pilot valve and a main gas burner valve, the plurality of gas valves being coupled to the provided pressurized gas fuel source, a gas pilot member coupled to a gas pilot valve, a gas burner coupled to a main gas burner valve, a gas pilot light ignitor, a pilot light sensor, and a main burner flame sensor. The heating and cooling means also includes a fan means for forcibly moving air through said inlet port, across the heater member and out the outlet port, the fan means being a beltless electric motor coupled to a fan blade assembly intended for increased reliability. The fan means including a primary electric motor, a shaft directly coupled at one end to the primary electric motor, a fan blade assembly directly coupled at other end of the shaft and a primary electric motor control relay member. A cooling means, said cooling means being a water piping arrangement positioned at said outlet port and having spray nozzles for injecting mist into the airflow stream and being hydraulically coupled to a relay controlled water pump and to said pressurized water source. An enclosure means for housing said heater member, said cooling means and said fan means, said enclosure means including an exterior portion defining said inlet port and an interior body portion including said outlet port. A first electrical cable harness means for electrically interconnecting said electric source to said heating and cooling means, and at least one thermal limit switch for powering off said heating and cooling system and being electrically coupled to an alarm system for simultaneously alerting a building manager about the system failure and elevated temperature condition. The said at least one thermal limit switch being mounted to said enclosure and the associated alarm system could be located in a convenient remote place in the building.

The plurality of booster fans means having an inlet end and an outlet end and being positioned in said mainstream airflow pattern for boosting and circulating said conditioned air along said mainstream airflow pattern. Each of said plurality of booster fans means comprising a second electrical cable harness means for electrically interconnecting to said electric source and to said first electrical cable harness means and to an electric motor having a beltless driven fan assembly. A relay member, communicating with said electric motor and being electrically coupled to said second electrical cable harness means. A booster fan cooling means, said booster fan cooling means being a water piping arrangement positioned at an oulet end of the booster fan enclosure and having spray nozzles for injecting mist into the airflow stream and being hydraulically coupled to a relay controlled water pump and to said pressurized water source. A booster fan enclosure means, said booster fan enclosure means housing said second electric cable harness means, said electric motor and fan assembly, said relay member and said booster fan cooling means, said booster fan enclosure means having a body portion defining said inlet end and said outlet end.

The control means for electronically controlling the operation of said heating and cooling system comprising a step down voltage source means coupled to said electrical source for supplying a control voltage to said control means, a primary system control relay, said primary system control relay being electrically coupled to said electric power source for simultaneous actuation, of said primary electric motor control relay, of each of said relay member in each of said plurality of booster fan means and also of a water pump relay member on a water pump coupled to said pressurized water source, an electronic ignition control portion, said electronic ignition control portion being electrically coupled to said primary system control relay and to said heater member and an electronic pulsating means coupled to said electronic ignition control portion for providing pulsating electrical power to said heating and cooling system according to a preset duty rate.

The plurality of emergency fans consisting of fan means positioned within said building for providing a back-up forcedair supply system in case of failure of said main forced-air heating and cooling system, said plurality of emergency fan means being electrically coupled to said electrical source and positioned to blow air in a transverse direction with respect to said mainstream airflow pattern.

Therefore, to the accomplishments of the foregoing objects, the invention consists of the foregoing features hereinafter fully described and particularly pointed out in the claims, the accompanying drawings and following disclosure describing in detail the invention, such drawings and disclosure illustrating, however, but one of the various ways in which the invention may be practiced.

BRIEF DESCRIPTION OF THE DRAWINGS

FIG. 3 is a schematic block diagram showing the electrical connections incorporating the water misting system, the pulsating control of relays to maintain a uniform and continuous wave of conditioned air, the safety thermal limit switch and alarm devices and the emergency fan system.

FIG. 4 is a schematic block diagram showing a combined electrical and gas flow connection from an electronic ignition portion of the control means to the heater member in the heating and cooling unit and being pulsated to maintain a uniform and continuous wave of conditioned air in a building according to the present invention.

DESCRIPTION OF THE PREFERRED EMBODIMENT

Figure 1:
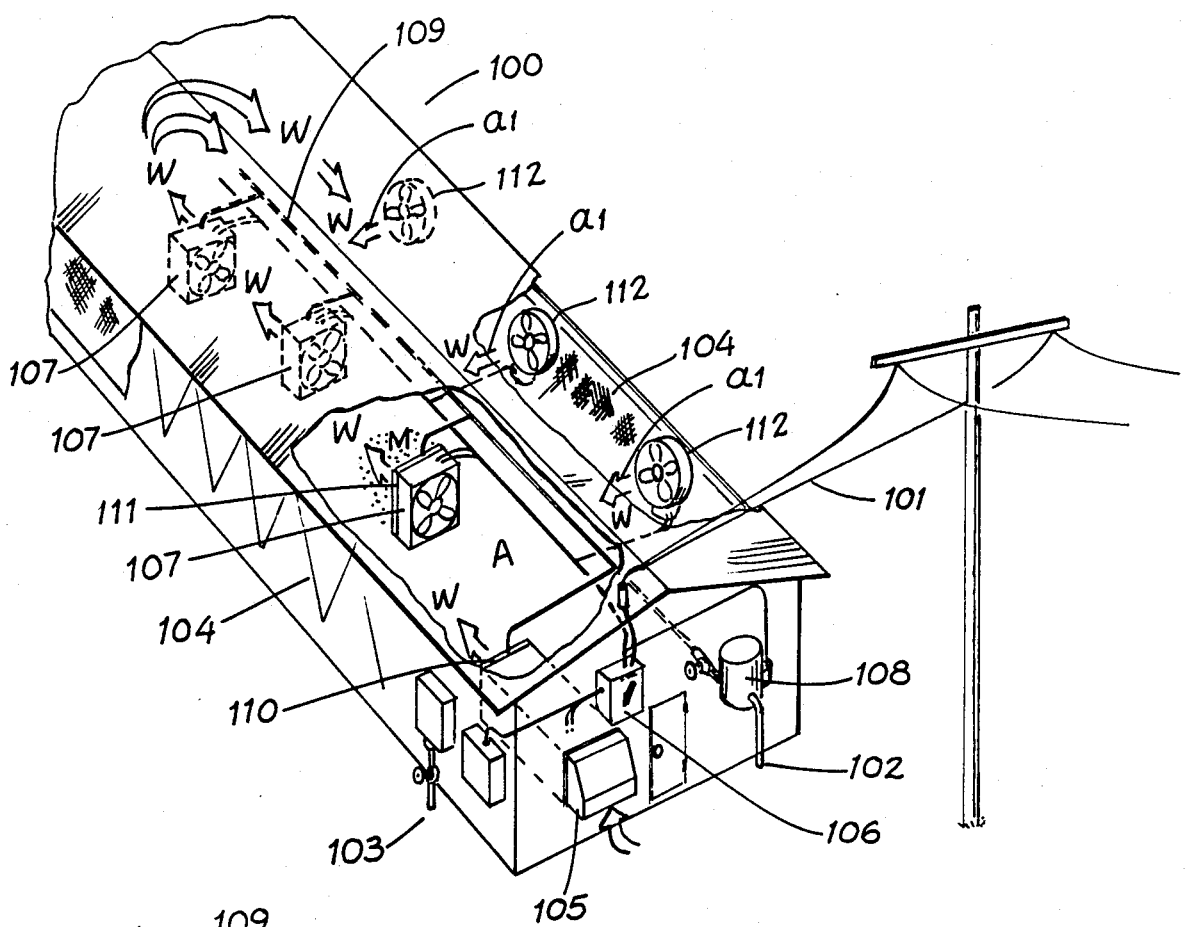
FIG. 1 is a fragmentary perspective view of an open area building, such as a poultry building, wherein is seen the placement of integral cooling means in the main blower of the heating and cooling unit and in each of the circulating booster fans.

Referring now to FIG. 1 where there is shown a building 100 constructed with a large open area, generally designated A, for housing livestock, such as poultry, and having available an electrical source 101, a pressurized water source 102, a gas source 103 and adjustable side wall curtains 104. A primary heating and cooling unit 105 is positioned at one end of the building 100 and being located offset from centerline of the building to allow generation of an airflow pattern, shown as arrows W. Heating and cooling unit 105 is electronically controlled by control means 106 which is in turn electrically coupled to electrical source 101. The heating and cooling system further includes a plurality of booster circulating fans 107 linearly spaced in the airstream of airflow pattern W. In satisfying an objective of the present invention, water misting arrangements 110 and 111 are integrated with the primary heating and cooling unit 105 and booster fans 107. The water misting arrangement includes a water pump 108, a water pump relay 108a, manual override switch 108b (see FIG. 3), distribution pipe 109 feeding a water misting means 110 within unit 105, and a similar water misting means 111 within each of the booster fan means 107. The water mist, designated M, is shown dispersed in airflow pattern W. Also shown in FIG. 1 is a set of emergency fans 112 positioned within building 100 to blow air in a transverse direction, designated as arrows a1, with respect to the airflow pattern W and for utilization upon failure of unit 105, the transverse airflow direction a1 makes use of the short distance between the curtain walls 104 to effectively remove livestock body heat out of the building.

Figure 2:
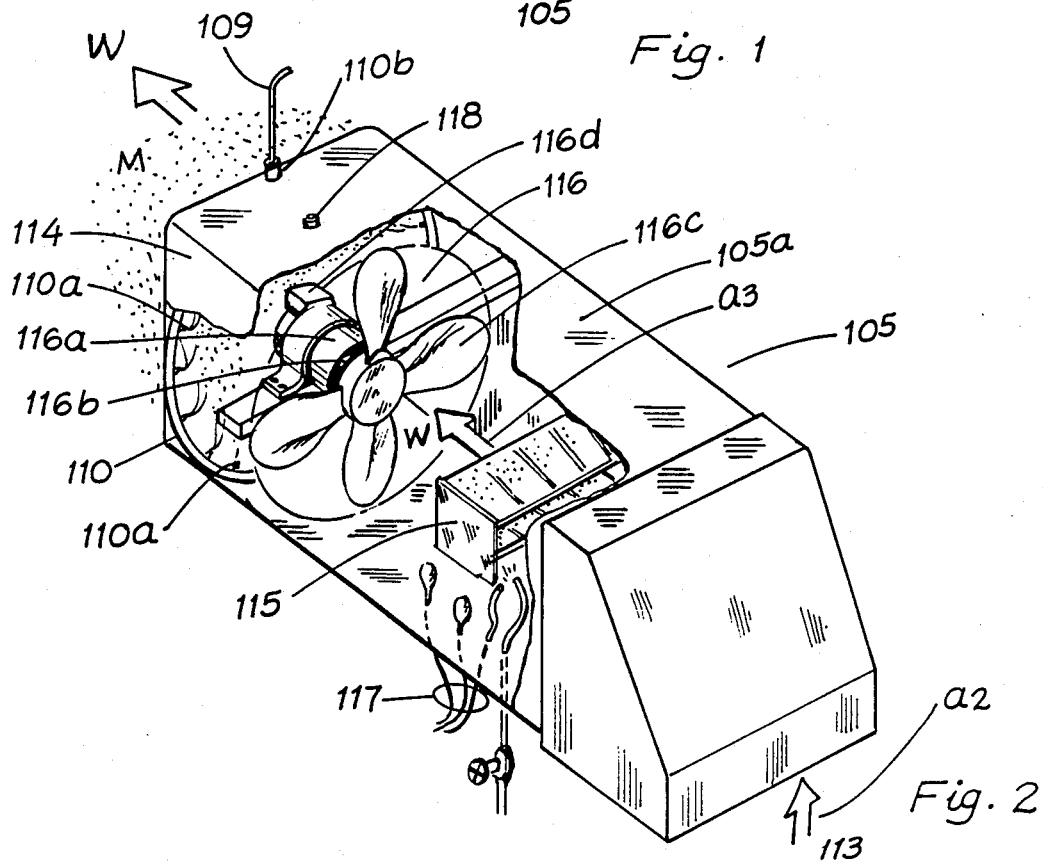
FIG. 2 is a partial cutaway view of a heating and cooling unit according to the present invention showing the cooling means installed at the outlet port and a beltless shaft-driven fan assembly installed in the enclosure.

Referring now to FIG. 2 showing a fragmentary view of the components of unit 105 including an enclosure 105a, an inlet port 113, an outlet port 114, a burner member 115, a fan means 116, a water misting means 110 and a cable harness 117. Although not shown in FIG. 2, but included schematically in FIG. 4, heater member 115 includes components such as gas pilot valve 115a, pilot 115b, pilot ignitor 115c, pilot flame sensor 115d, primary burner valve 115e, burner 115f, burner sensor 115g and supplemental gas valve 115h. Referring back to FIG. 2, the fan means 116 is shown to be mounted in enclosure 105a between burner 115 and water misting arrangement 110. The fan means includes an electric motor 116a, a shaft 116b coupling motor 116a to fan assembly 116c. Electric motor 116a is controlled by a relay means 116d via cable harness 117 which is in turn electrically coupled to control means 106. It will be appreciated that the location of the control means 106 is left to the discretion of the user. Also shown in FIG. 2 is the water misting arrangement 110 located forward of fan means 116. Water misting arrangement 110 includes spray nozzles 110a and pipe coupling 110b for hydraulically being inter connected to distribution pipe 109. In operation, airflow is drawn by fan means 116 into inlet port 113, shown as arrows a2, across heater member 115, shown as arrow a3, across electric motor 116a, through water mist M and out outlet port 114 to generate wind pattern W. Attached to enclosure 105a is a thermal limit switch 118 which is suitably located to detect an elevated temperature. In fulfilling an objective of the invention, the thermal limit switch would be electrically coupled to the control means 106 via cable harness 117 which in turn would be further coupled to an alarm system 119 suitably located in building 100.

Figure 5:
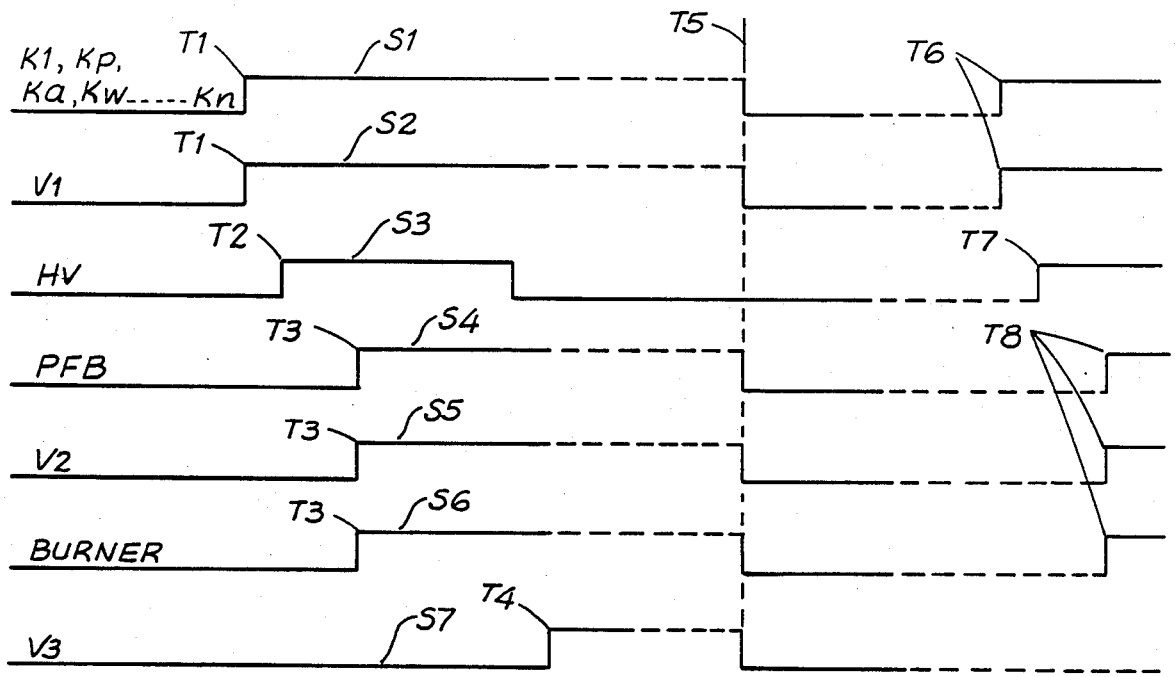
FIG. 5 is a timing chart of the energizing sequence of the various control relays and gas valves in the functional devices according to the present invention.
Figure 6:
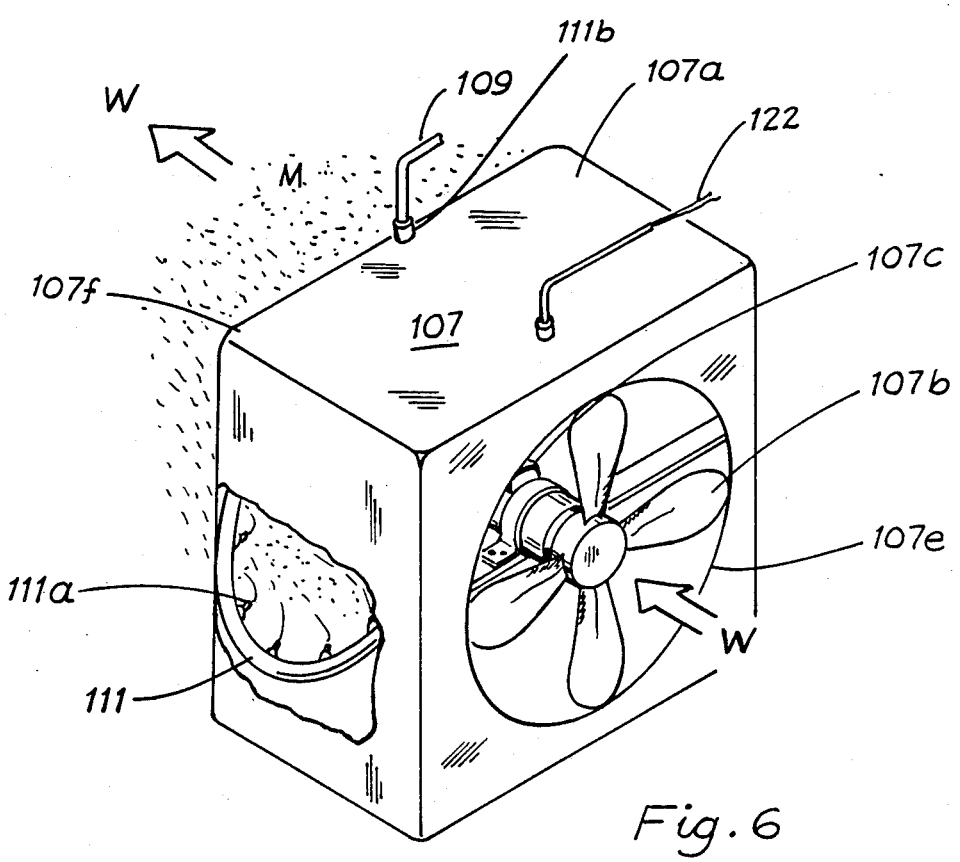
FIG. 6 is a partial cutaway view of a booster circulating fan means according to the present invention showing the cooling means installed at the outlet end of the enclosure, and having a shaft-driven fan assembly.

FIG. 6 shows a booster fan 107 having airflow W being draw into inlet end 107e by a beltless, shaft driven fan assembly 107b and further passed through water mist M to exhaust out outlet end 107f. Booster fan means 107 includes an enclosure 107a, fan assembly 107b and water misting arrangement 111. The water misting arrangement 111 is connected to water pump 108a via distribution pipe 109 using coupling 111b. The water misting action M is generated by spray nozzles 111a. The electrical interface to fan means 107 is via electrical cable harness 122 which includes a control line for coupling to relay 107c and electrical power source 101 via circuit breaker 107d. Referring now to FIGS. 3, 4 and 5, electrical source 101, shown as a 240 vac, feeds a main line circuit breaker 101a and other system circuit breakers 112, feeding emergency fans 112, circuit breaker 107d feeding the booster fans and circuit breaker 106a feeding the control means 106 and main heating and cooling unit 105. In operation circuit breaker 112a is in the off position and is turned on manually to power fans 112 by a building operator upon emergency conditions such as when a thermal switch 118 activates alarm 119. Circuit breaker 107d is normally on during the time the system is in use. The ac power to fan means 107 is controlled by control means 106 which energizes relay 107c via primary relay 106b. Circuit breaker 106a is also normally on and provided primary power to step down transformer 106c which generates a low control voltage for safely powering the control means 106. The low volage is distributed to a an electronic pulsating means 106d which is set to deliver an electrical signal at a preset duty rate, generally five (5) minutes on and five (5) minutes off, to electronic ignition means 120. It should be noted that thermal switch(s) 118, and alarm 119 are preferably electrical coupled between the pulsating means 106d and the electronic ignition 120. The functional description beyond electronic ignition 120 is best understood by referring to FIG. 4 and FIG. 5, where electronic ignition 120 responds to pulsating means 106d to activate pilot gas valve V1, designated 115a via cable harness lead 117a, relays 106b, 108a (assuming manual switch 108b is on), relay 116d and as many connected booster fan relays 107c, all being activated at arbitrary time T1 and shown as sequence line S1 for the relays and S2 for the pilot gas valve. The water pump 108 feeds water from water source 102, upon being electrically turned on by relay 108a, to water misting devices 110 and 111 via pipe 109. The gas pilot 115b is preferably lit using a high voltage ignitor 115c. Thus, at time T2 the electronic ignition 120 will transmit a high voltage via cable harness lead 117b to ignitor 115c (HV), shown as sequence line S3, to ignite gas pilot 115b. At time T3, the pilot flame sensor 115d (PFB), feedback via lead 117c and allows ignition 120 to activate main gas burner valve C2, designated 115e, via lead 117d (assuming thermostat 121a temperature setting allows electrical conduction to allow gas to flow from gas source 103 to gas burner 115f (BURNER). Since pilot 115b had been previously ignited, burner 115f will be ignite. The sequence lines designated S4, S5 and S6 show these events. The pilot ignitor is deactivated as shown on sequence line S3. Burner flame sensor 115g, via lead 117e, will monitor burner 115f and will deactivate gas valve 115e upon detecting loss of flame. A supplemental thermostat 121b located separately from 121a and set at a higher temperature setting can activate valve 115h (V3) at an arbitrary time T4, to feed additional gas to burner 115f, see sequence line S7. The electronic pulstaing circuit 106d will turn the system off according to a preset duty cycly such as at T5 and back on at T6, the sequence of event then follow as previously described and shown as T7 and T8 and repeat in response to pulser 106d.

Therefore, while the present invention has been shown and described herein in what is believed to be the most practical and preferred embodiment, it is recognized that departures can be made therefrom within the scope of the invention, which is therefore not to be limited to the details disclosed herein but is to be accorded the full scope of the claims so as to embrace any and all equivalent apparatus.

We claim:

1. A heating and cooling system for installation within a poultry building, said poultry building having an electrical source, a pressurized gas fuel source and a pressurized water source available for utilization by said system, said system comprising:
   (a) a main forced-air heating and cooling means having an inlet port and outlet port for heating and cooling and forcing conditioned air into a mainstream airflow pattern within said poultry building;
   (b) a plurality of booster fan means, having an inlet end and an outlet end, positioned in said mainstream airflow pattern for boosting said conditioned air along said mainstream airflow pattern;
   1(c) a plurality of direct contact air cooling means operatively associated with said plurality of booster fan means for aiding in further conditioning said forced conditioned air in said mainstream airflow pattern, said plurality of direct contact air cooling means by hydraulically coupled to a water pump coupled to said pressurized water source; and
   (d) a control means for electronically controlling the actuation of:
      (i) a plurality of gas valves coupled to said pressurized gas source and to said main forced-air heating and cooling means,
      (ii) a plurality of electrical relays coupled to said electrical source and to said main forced-air heating and cooling means and said plurality of booster fan means and
      (iii) said water pump.

2. A heating and cooling system for installation within a poultry building as recited in claim 1, said system further comprising: an alarm system electrically coupled to said control means.

3. A heating and cooling system for installation within a poultry building as recited in claim 1, said system further comprising:
   a plurality of emergency fan means positioned within said poultry building for providing a back-up forced-air supply system in case of failure of said main forced-air heating and cooling means, said plurality of emergency fan means being electrically coupled to said electrical source and positioned to blow air in a transverse direction with respect to said mainstream airflow pattern.

4. A heating and cooling system for installation within a poultry building as recited in claim 2, wherein: said main forced-air heating and cooling means comprises,
   (a) a heater member, said heater member including said plurality of gas valves, a gas pilot member coupled to a designated gas pilot valve member, a gas burner coupled to a first gas burner valve member, a gas pilot light ignitor, a pilot light sensor, a burner flame sensor;
   (b) a fan means for forcibly moving air through said outlet port, said fan means including a primary electric motor, a shaft directly coupled at one end to said primary electric motor, a fan blade assembly directly coupled at other end of said shaft and a primary electric motor control relay member electrically coupled to said electrical source, to said control means, and to said primary electric motor;
   (c) a primary direct contact air cooling means, said primary direct contact air cooling means being hydraulically coupled to said pressurized water source;
   (d) an enclosure means for housing said heater member, said fan means and said primary direct contact air cooling meand, said enclosure means including an exterior portion defining said inlet port and an interior body portion including said outlet port;
   (e) a first electrical cable harness means for electrically interconnecting said electrical source and said control means to said fan means and said heater means; and
   (f) at least one thermal limit switch electrically coupled to said control means via said electrical harness for powering off said heating and cooling means and simultaneously activating said alarm system, said at least one thermal limit switch being mounted to said enclosure.

5. A heating and cooling system for installation within a poultry building as recited in claim 4, wherein each of said plurality of booster fan means comprises:

(a) a second electrical cable harness means for electrically interconnecting to said electric source and to said first electrical cable harness means;

(b) an electric motor and fan assembly;

(c) a relay member, said electric motor and relay member being electrically coupled to said second electrical cable harness means;

(d) a booster fan air cooling member of said plurality of direct contact air cooling means, said booster fan air cooling member being hydraulically coupled to said pressurized water source; and (e) a booster fan enclosure means, said booster fan enclosure means housing said second electric cable harness means, said electric motor and fan assembly, said relay member and said booster fan air cooling member, said booster fan enclosure means having a body portion defining said inlet end and said outlet end.

6. A heating and cooling system for installation within a poultry building as recited in claim 5, wherein said control means comprises:

(a) a step down voltage source means coupled to said electrical source for supplying a control voltage to said control means;

(b) a primary system control relay, said primary system control relay being electrically coupled to said electric power source for simultaneous actuation of said primary electric motor control relay, of each of said relay member in each of said booster fan means as well as said water pump;

(c) an electronic ignition control portion, said electronic ignition control portion being electrically coupled to said primary system control relay and to said heater member; and (d) an electronic pulsating means coupled to said electronic ignition control portion for simultaneously actuating, said primary system control relay, said gas pilot valve member, said primary electric motor control relay, said relay member in each of said booster fan means, and said water pump according to a preset duty rate.

7. A heating and cooling system for installation within a poultry building as recited in claim 6, wherein:

said primary direct contact air cooling means being positioned in said outlet port of said main forced-air heating and cooling means and said booster fan air cooling member in each of said plurality of booster fan means being positioned in each of said outlet end of said plurality of booster fan means, each of said primary direct contact air cooling means and booster fan air cooling member comprising a water pipe arrangement with spray nozzles for injecting a water mist into said mainstream air flow pattern.

8. A heating and cooling system for installation within a poultry building as recited in claim 7, said system further comprising:

a plurality of emergency fan means positioned within said poultry building for providing a back-up forced-air supply system in case of failure of said main forced-air heating and cooling means, said plurality of emergency fans means being electrically coupled to said electrical source and positioned to blow air in a transverse direction with respect to said mainstream airflow pattern.

9. A heating and cooling system for installation within a poultry building as recited in claim 7, wherein said primary direct contact air cooling means and said booster fan air cooling member further comprises: a manual override switch means for manually powering off said water pump.

10. A heating and cooling system for installation within a poultry building, said poultry building having an electrical source, a pressurized gas fuel source and a pressurized water source available for utilization by said system, said system comprising:

(a) a main forced-air heating and cooling means having an inlet port and outlet port for forcing conditioned air into a mainstream airflow pattern within said poultry building, said main forced-air heating and cooling means comprises, (i) a heater member, said heater member comprising:
a plurality of gas valves, including a gas pilot valve and a main gas burner valve, said plurality of gas valves coupled to said pressurized gas fuel source,
a gas pilot member coupled to said gas pilot valve,
a gas burner coupled to said main gas burner valve,
a gas pilot light ignitor,
a pilot light sensor, and
a main burner flame sensor, (ii) a fan means for forcibly moving air through said outlet port, said fan means including
a primary electric motor,
a shaft directly coupled at one end to said primary electric motor,
a fan blade assembly directly coupled at other end of said shaft and a primary electric motor control relay member, (iii) a cooling means, said cooling means being hydraulically coupled to said pressurized water source, (iv) an enclosure means for housing said heater member, said cooling means and said fan means, said enclosure means including an exterior portion defining said inlet port and an interior body portion including said outlet port, (v) a first electric cable harness means for electrically interconnecting said electric source to said main forced-air heating and cooling means, and (vi) at least one thermal limit switch for powering off said heating and cooling system and simultaneously activating an alarm system, said at least one thermal limit switch being mounted to said enclosure;

(b) a plurality of booster fans means, having an inlet end and an outlet end, positioned in said mainstream airflow pattern for boosting said conditioned air along said mainstream airflow pattern, each of said plurality of booster fans means comprises:

(i) a second electrical cable harness means for electrically interconnecting to said electric source and to said first electrical cable harness means, (ii) an electric motor and fan assembly, (iii) a relay member, said electric motor and relay member being electrically coupled to said second electrical cable harness means, (iv) a booster fan direct contact air cooling means, said booster fan direct contact air cooling means being hydraulically coupled to said pressurized water source, and (v) a booster fan enclosure means, said booster fan enclosure means housing said second electric cable harness means, said electric motor and fan assembly, said relay member and said booster fan direct contact air cooling means, said booster fan enclosure means having a body portion defining said inlet end and said outlet end; and (c) a control means for electronically controlling the operation of said heating and cooling system, said control means comprising:
  (i) a step down voltage source means coupled to said electrical source for supplying a control voltage to said control means,
  (ii) a primary system control relay, said primary system control relay being electrically coupled to said electric power source for simultaneous actuation of: said primary electric motor control relay, of each of said relay member in each of said plurality of booster fan means and also of a water pump relay member on a water pump coupled to said pressurized water source,
  (iii) an electronic ignition control portion, said electronic ignition control portion being electrically coupled to said primary system control relay and to said heater member; and
  (iv) an electronic pulsating means coupled to said electronic ignition control portion for providing electrical power to said heating and cooling system according to a preset duty rate; and (d) an alarm system coupled to said thermal limit switch and said control means.

11. A heating and cooling system for installation within a poultry building as recited in claim 10, wherein:
said cooling means being positioned in said outlet port of said main forced-air heating and cooling means and said booster fan direct contact air cooling means in each of said plurality of booster fan means being positioned in each of said outlet end of said plurality of booster fan means, each of said cooling means and said booster fan direct contact air cooling means comprising a water pipe arrangement with spray nozzles for injecting a water mist into said mainstream airflow pattern.

12. A heating and cooling system for installation within a poultry building as recited in claim 11, said system further comprising:
a plurality of emergency fan means positioned within said poultry building for providing a back-up forced-air supply system in case of failure of said main forced-air heating and cooling means, said plurality of emergency fan means being electrically coupled to said electrical source and positioned to blow air in a transvese direction with respect to said mainstream airflow pattern.

13. A heating and cooling system for installation within a poultry building as recited in claim 10, said system further comprising:
a plurality of emergency fan means positioned within said poultry building for providing a back-up forced-air supply system in case of failure of said main forced-air heating and cooling means, said plurality of emergency fan means being electrically coupled to said electrical source and positioned to blow air in a transverse direction with respect to said mainstream airflow pattern.

14. A method of conditioning air in a poultry building, said method comprising the steps of:
A. providing a heating and cooling system for said poultry building, said poultry building having an electrical source, a pressurized gas fuel source and a pressurized water source available for utilization by said system, said system comprising:
(a) a main force-air heating and cooling means having an inlet port and outlet port for forcing conditioned air into a mainstream airflow pattern within said poultry building, said main forced-air heating and cooling means comprises:
  (i) a heater member, said heater member comprising:
    a plurality of gas valves, including a gas pilot valve and a main gas burner valve, said plurality of gas valves coupled to said pressurized gas fuel source,
    a gas pilot member coupled to said gas pilot valve,
    a gas burner coupled to said main gas burner valve,
    a gas pilot light ignitor,
    a pilot light sensor, and
    a main burner flame sensor,
  (ii) a fan means for forcibly moving air through said outlet port, said fan means including:
    a primary electric motor,
    a shaft directly coupled at one end to said primary electric motor, and
    a fan blade assembly directly coupled at other end of said shaft and a primary electric motor control relay member,
  (iii) a cooling means, said cooling means being hydraulically coupled to said pressurized water source,
  (iv) an enclosure means for housing said heater member, said cooling means and said fan means, said enclosure means including an exterior portion defining said inlet port and an interior body portion including said outlet port,
  (v) a first electrical cable harness means for electrically interconnecting said electric source to said main forced-air heating and cooling means, and
  (vi) at least one thermal limit switch for powering off said heating and cooling system and simultaneously activating an alarm system, said at least one thermal limit switch being mounted to said enclosure, (b) a plurality of booster fans means, having an inlet end and an outlet end, positioned in said mainstream airflow pattern for boosting said conditioned air along said mainstream airflow pattern, each of said plurality of booster fans means comprises:
  (i) a second electrical cable harness means for electrically interconnecting to said electric source and to said first electrical cable harness means,
  (ii) an electric motor and fan assembly,
  (iii) a relay member, said electric motor and relay member being electrically coupled to said second electrical cable harness means,
  (iv) a booster fan direct contact air cooling means, said booster fan direct contact air cooling means being hydraulically coupled to said pressurized water source, and
  (v) a booster fan enclosure means, said booster fan enclosure means housing said second electric cable harness means, said electric motor and fan assembly, said relay member and said booster fan direct contact air cooling means, said booster fan enclosure means having a body portion defining said inlet end and said outlet end,
(c) a control means for electronically controlling the operation of said heating and cooling system, said control means comprising:
  (i) a step down voltage source means coupled to said electrical source for supplying a control voltage to said control means,
  (ii) a primary system control relay, said primary system control relay being electrically coupled to said electric power source for simultaneous actuation of: said primary electric motor control relay, of each of said relay member in each of said plurality of booster fan means and also of a water pump relay member on a water pump coupled to said pressurized water source,
  (iii) an electronic ignition control portion, said electronic ignition control portion being electrically coupled to said primary system control relay and to said heater member, and
  (iv) an electronic pulsating means coupled to said electronic ignition control portion for providing electrical power to said heating and cooling system according to a preset duty rate,
  (v) a manual override switch means for manually powering off said water pump,
  (vi) a thermostatic control means for controlling said plurality of gas valves, and (d) an alarm system coupled to said thermal limit switch and said control means;
B. setting a desired on/off period on said electronic pulsating means;
C. positioning said manual override switch means to an on position;
D. setting said thermostatic control means according a desired environment temperature operating condition; and
E. energizing said system by applying power to said control means.

15. A method of conditioning air in a poultry building, as recited in claim 14, wherein, said step of positioning said manual override switch means is changed to positioning to an off position.

16. A method of conditioning air in a poultry building, as recited in claim 15, wherein, said step of providing a heating and cooling system further includes:
(a) providing a plurality of emergency fan means positioned within said poultry building for providing a back-up forced-air supply system in case of failure of said main forced-air heating and cooling means, said plurality of emergency air means being electrically coupled to said electrical source and positioned to blow air in a transverse direction with respect to said mainstream airflow pattern; and
(b) using said provided plurality emergency fan means in the event of failure of said main forced-air heating and cooling means.

* * * * *